United States Patent Office 2,795,913
Patented June 18, 1957

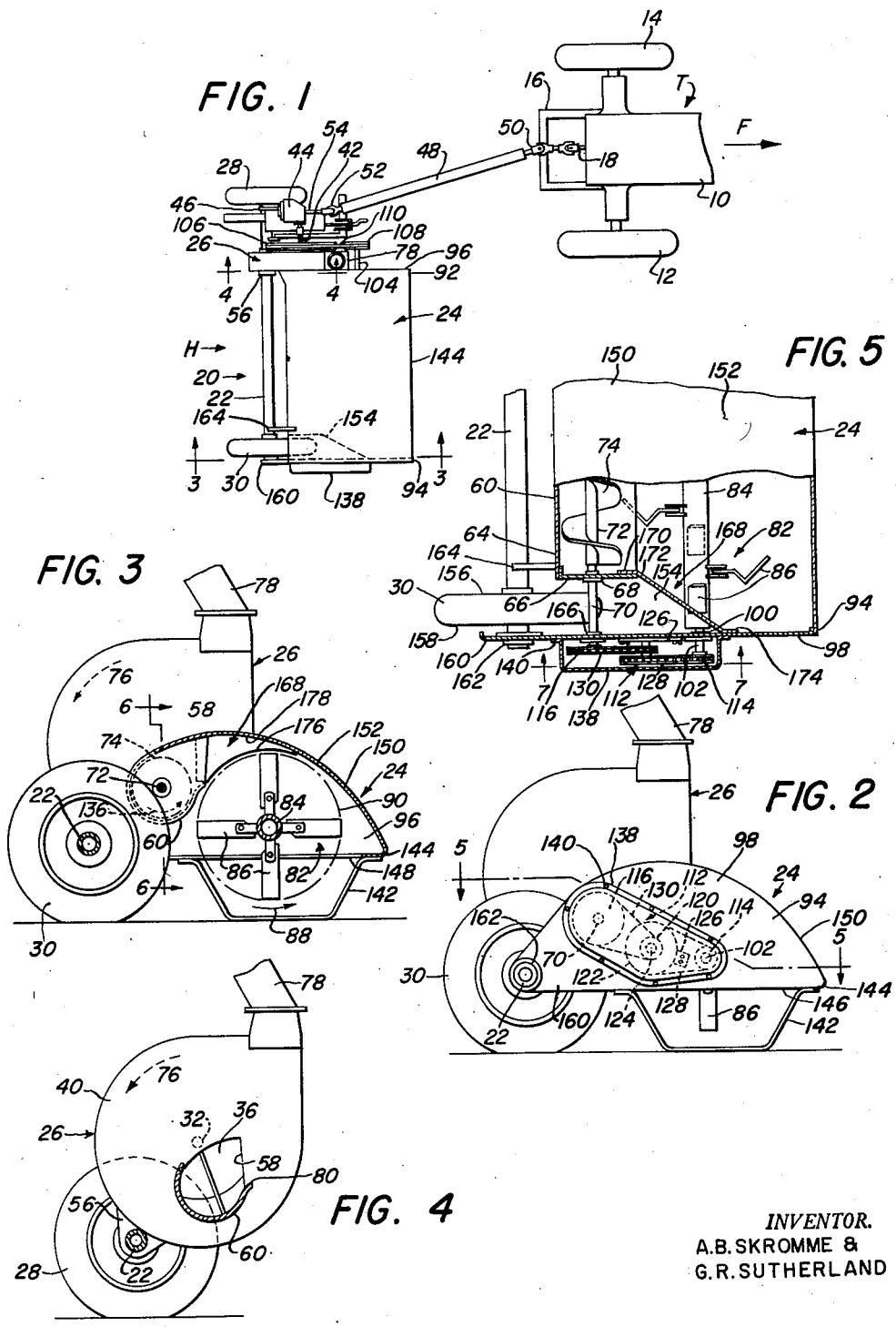

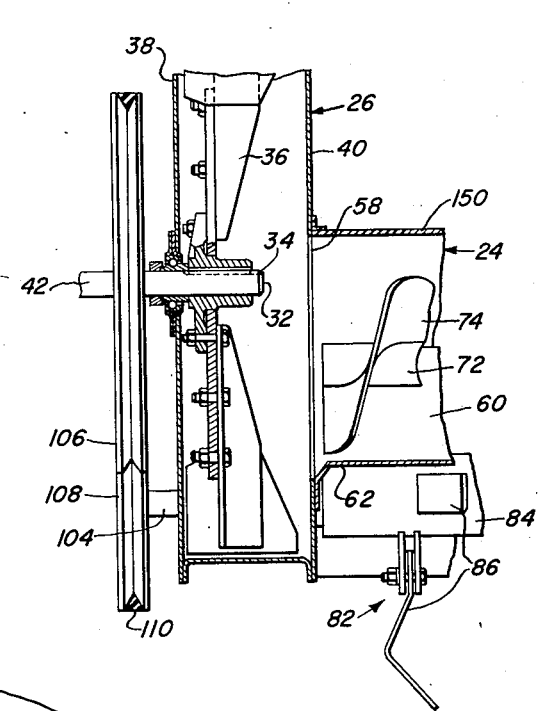
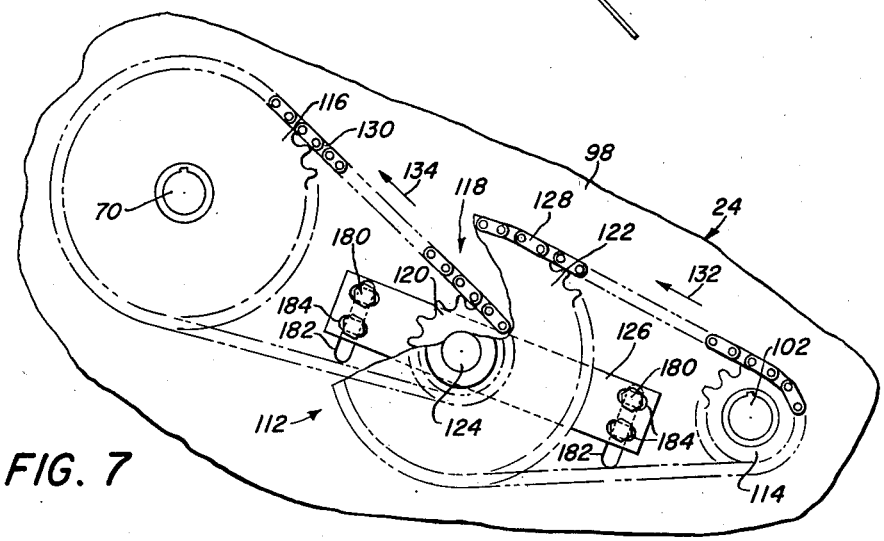

2,795,913

FORAGE HARVESTING AND CHOPPING DEVICE

Arnold B. Skromme and Gail R. Sutherland, Ottumwa, Iowa, assignors to Deere Manufacturing Co., Dubuque, Iowa, a corporation of Iowa Application November 12, 1954, Serial No. 468,349

15 Claims. (Cl. 56—24)

This invention relates to a harvester and more particularly to a harvester of the type known as a field or forage harvester, which collects field-borne crops, reduces the collected crops and delivers such crops to a trailing vehicle or other suitable receptacle in the field.

A typical harvester of the general character referred to above will include supporting structure adapted to advance over a field of crops. The supporting structure carries an axially elongated crop-collecting rotor having its axis transverse to the line of travel and rotatable in such direction as to generate a cylinder, any point on which moves downwardly and forwardly through the crops, then upwardly and rearwardly. Located behind the rotor is a conveyor housing into which the collected crops are transferred by the rotor. The conveyor has a terminal end feeding into a crop-receiving means such as a blower housing in which is carried a rotatable blower for ultimately delivering the crops to a trailing receptacle. Such machines are designed primarily to accommodate relatively wide swaths and there thus arises a problem of supporting the rotor, the rotor housing and allied structure in such manner that the supporting wheels do not travel over crops adjacent to the swath being collected. At the same time, for purposes of proper balance, it is desired to locate the supporting wheels as close as possible to the rotor. Heretofore, this problem was not satisfactorily solved, because of the coextensive length of the rotor and the conveyor to which the rotor delivered. However, according to the present invention, the conveyor housing is made somewhat shorter than the rotor housing, thus giving the conveyor housing a terminal end spaced inwardly from the outer end of the rotor and defining a pocket in which the fore part of the proximate supporting wheel can extend without interference with either the rotor or the conveyor. Another feature of the invention is the provision of a rearwardly and inwardly inclined deflector for directing crops to the conveyor from the portion of the rotor that exceeds in length the shorter conveyor housing.

A design according to the present invention affords a lower conveyor housing and therefore improves the feeding relationship between the conveyor and the blower housing, enabling the use of a lower inlet opening in the blower housing, in addition to which the arrangement improves the balance and over-all operational characteristics of the machine. Because of the lower inlet for the blower housing, the blower shaft and auger shaft in the conveyor housing are vertically offset or non-coaxial, which prohibits the use of a direct or coaxial drive between the two. According to the present invention, this problem is eliminated by the provision of improved driving means in which the auger is driven from the rotor at the end thereof remote from the blower housing. The drive mechanism features speed-reduction means including a pair of endless drive elements having drive wheels or sprockets respectively on the auger and rotor shafts and an intermediate double-sprocket assembly which is adjustable both vertically and fore and aft to accommodate changes in tension of either or both of the endless drive elements or chains.

In a harvester of the general type noted, the rotor has a central axial shaft on which is mounted a plurality of angularly and axially spaced radial arms which, as stated above, generate a cylinder when rotated, it being a characteristic of the machine that the arms not only sever the field-borne crops from the ground (or pick up crops lying on the ground) but serve also to transfer the crops rearwardly beneath a housing and into the auger conveyor housing that is located rearwardly of the rotor. However, in prior machines an important defect existed in that all of the material picked up from the ground was not delivered to the auger; that is, there was some loss of material back to the ground. According to the present invention, this defect is eliminated by the provision of a rotor housing designed to afford minimum radial clearance between the top of the housing and the tips of the radial arms at an upper fore part of the cylinder generated by operation of the rotor. Since the clearance in the zone indicated is relatively small or close, the speed of the severed material more nearly approaches the speed of the rotor. Fundamentally, the speed of the material is increased, resulting in an increase in centrifugal force, causing the severed material to cling to the undersurface of the rotor housing top until well back over the auger conveyor, the top being thence directed downwardly to insure the transfer of the material to the conveyor.

The foregoing and other important objects and desirable features inherent in and encompassed by the invention will become apparent as a preferred embodiment of the invention is disclosed in detail in the ensuing description and accompanying sheets of drawings, the several figures of which will be described immediately below.

Fig. 1 is a plan view of a typical machine in which the aforesaid features of the invention are embodied.

Fig. 2 is an end elevational view, on an enlarged scale, of the harvesting machine.

Fig. 3 is a sectional view, on the scale of Fig. 2, as seen along the line 3—3 of Fig. 1.

Fig. 4 is a sectional view, on the scale of Figs. 2 and 3, as seen along the line 4—4 of Fig. 1.

Fig. 5 is a fragmentary sectional view, on the scale of Figs. 2, 3 and 4, as seen along the line 5—5 of Fig. 2.

Fig. 6 is a fragmentary vertical sectional view, on a scale enlarged over that of Fig. 3, as seen along the line 6—6 of Fig. 3.

Fig. 7 is a fragmentary end view of the driving mechanism, drawn to an enlarged scale, as seen along the line 7—7 of Fig. 5.

In Fig. 1, the harvester H is shown as being connected to a tractor T for advance over a field of crops, the normal direction of movement being indicated by the arrow F. The tractor, as is conventional, includes a central body 10, only the rear portion of which is shown, carried between right- and left-hand traction wheels 12 and 14, and having a rearwardly extending drawbar 16 and a rearwardly extending power take-off shaft 18.

The harvester comprises essentially a main frame or supporting structure, designated generally by the numeral 20, including an axle 22, combined rotor and conveyor housing structure 24, a crop-receiving or blower housing 26, and suitable frame members to be hereinafter described. The axle 22 is elongated and is arranged with its length transverse to the line of advance and carries respectively at its first and second or left-hand and right-hand ends left-hand and right-hand ground-engaging wheels 28 and 30. Thus, the machine or supporting structure may be spoken of as having first and second opposite sides corresponding generally to the locations of the wheels 28 and 30.

The blower housing 26 is relatively narrow in a transverse direction and is typically formed of substantially circular shape about a central axis on which is journaled a blower shaft 32. The blower housing extends primarily fore and aft and is of an upright nature, and the shaft 32 is transverse to the line of advance. This shaft has an inner portion 34 to which is keyed a blower 36 operative between the left-hand and right-hand side walls 38 and 40 of the blower housing 26. The shaft 32 has an external or left-hand portion 42 which projects at the first or left-hand side of the machine, being suitably driven at that point by drive mechanism (not shown) contained within a gear housing 44 that is supported on framework 46 at the left-hand end or side of the supporting structure. A conventional combined propeller shaft and tongue structure 48 interconnects the tractor drawbar and the supporting structure 20 and includes appropriate shafting 50 and 52 for establishing drive between the tractor power take-off 18 and an input shaft 54 for the gear housing 44.

The blower housing 26 is appropriately mounted on the axle 22, by any suitable supporting means, such as brackets 56 (Figs. 1 and 4), and is thus carried above although somewhat ahead of the axle 22. The right-hand wall 40 of the blower housing has a feed or crop inlet 58, which, as seen, is principally below the blower shaft 32. A generally semicircular conveyor housing or auger trough 60 has a first or left-hand end 62 communicating with or feeding into the inlet opening 58 in the blower housing 26. The auger trough is elongated and has its length transverse to the line of travel and thus extends horizontally from and at right angles to the blower housing 26, having an outer, second or right-hand end 64 proximate to but terminating short of the second or right-hand wheel 30 (Fig. 5).

The auger housing 60 has a right-hand terminal end wall 66 in which is a bearing 68 for journalling the outer or right-hand end portion 70 of a central auger shaft 72 on which is coaxially carried an auger 74 for feeding material along the auger trough 60 for ultimate delivery into the feed inlet 58 of the blower housing 26. Material entering the blower housing 26 is picked up by the blower 36, which rotates in the direction of the dotted-line arrow 76 (Figs. 3 and 4), and ultimately delivered upwardly through a tangentially disposed discharge spout 78. This spout curves rearwardly, as is conventional, for delivery of the material to a trailing vehicle (not shown) customarily used with a machine of the type herein disclosed.

Supporting of the auger 74 in the bearing 68 is adequate and there is no need for the provision of a similar bearing at the blower-proximate or inner end of the auger.

Because of its generally semicircular shape, the auger housing 60 has lengthwise thereof and facing generally forwardly and upwardly a crop-inlet portion or opening 80 (Fig. 4) into which crops collected from the field are delivered by a crop-collecting means in the form of a rotor, designated generally by the numeral 82. This rotor comprises an axially elongated rotor shaft 84 and a plurality of radial arms 86 pivotally connected to the shaft 84 in angularly and axially spaced relationship. The rotor shaft is appropriately journaled in the supporting structure, here via the housing structure 24, for rotation in the direction of the arrow 88 (Fig. 3) and, when rotating, operates to generate a cylinder, indicated by broken lines 90 in Fig. 3, just ahead of the auger housing 60.

The housing structure 24 is a combined rotor and conveyor housing, since it overlies both, extending both lengthwise and fore and aft of the rotor and auger, and, because of its tunnel shape, it has an open bottom for receiving upwardly directed crops from the rotor. This crop-collecting or rotor housing 24 has first and second or left-hand and right-hand ends 92 and 94, respectively, located respectively at right- and left-hand sides of the supporting structure 20. The ends 92 and 94 of the housing 24 are defined respectively by upright end walls 96 and 98, each of which has appropriate bearings coaxial on a transverse horizontal axis for journaling the rotor shaft 84. The details of a suitable bearing for the right-hand end of the rotor shaft appear in Fig. 5, wherein the bearing is designated by the numeral 100 and the right-hand end of the rotor shaft is indicated by the numeral 102. A similar bearing, not shown in detail, is provided in the housing left-hand wall 96 for journaling the left-hand end 104 of the rotor shaft 84. The left-hand rotor shaft end 104 constitutes a first rotor shaft portion at the first or left-hand side of the machine and ahead of the left-hand end 42 of the blower shaft 32. First drive means interconnects these two shaft portions 42 and 104, the drive means here taking the form of a relatively large sheave 106 fixed to the blower shaft end portion 42, a relatively smaller sheave 108 fixed to the left-hand end portion 104 of the rotor shaft 84 and an endless belt 110 interconnecting the two sheaves. Because of the relative sizes of the sheaves 106 and 108, the speed of rotation of the rotor 82 will be substantially higher than that of the blower 36.

A second drive means, best shown in Figs. 5 and 7, is located at the second or right-hand end of the machine and interconnects the right-hand end 102 of the rotor shaft 84 and the right-hand end 70 of the auger shaft 72. This drive means comprises speed-reduction mechanism 112 including a small driving wheel or sprocket 114 coaxially fixed to the rotor shaft right-hand end portion 102, a large driven wheel or sprocket 116 coaxial with and fixed to the right-hand auger shaft portion 70 and an intermediate double-wheel or double-sprocket assembly 118 longitudinally intermediate the sprockets or wheels 114 and 116. This assembly includes a small intermediate wheel or sprocket 120 and a large intermediate wheel or sprocket 122 rotatable in unison about a common transverse axis because the two wheels are unitary and are journaled on a short transverse shaft 124 mounted on a bracket 126 affixed to the right-hand end wall 98 of the crop-collecting or rotor housing 24. A first endless drive element in the form of a chain 128 is trained about and interconnects the sprockets 114 and 122. A second endless drive element in the form of a chain 130 is trained about and interconnects the sprockets 120 and 116. Because of the speed reduction afforded, the rotation of the auger shaft 70 is at a speed considerably lower than that of the rotor 82. Arrows 132 and 134 indicate the directions of travel of the chains 128 and 130 and an arrow 136 indicates the direction of rotation of the auger 74 (Fig. 3).

The entire drive means, just described, for the interconnection between the rotor and auger shafts is enclosed by a removable casing or cover 138, which is mounted on the rotor housing right-hand end wall 98 as by a plurality of cap screws 140.

Opposite ends of the rotor housing 24 include depending U-shaped skids 142 which serve to sustain the harvester when it is detached from the tractor.

As previously described, the rotor 82 rotates in the direction of the arrow 88 to generate the cylinder 90 during its operation in its crop-collecting function. The radial arms 86 operate in succession to sever crops from the ground or to pick up from the ground crops lying there after having been previously harvested or otherwise detached from the ground. As the radial arms travel in succession downwardly and forwardly through the crops, they pick up the crops and continue upwardly and forwardly and then rearwardly beneath the undersurface of the rotor housing 24, the severed crops clinging to said undersurface and being ultimately thrown through the auger inlet opening 80 and into the auger trough 60 for ultimate transfer by the auger 74 to the blower housing 26. The shape of the rotor housing 24 is of importance and for that reason will be described in detail.

As already indicated, the housing 24 may be considered a combined rotor and conveyor housing, since it overlies both the rotor and the auger. However, in the interests of brevity, the housing 24 will be referred to simply as the rotor housing. This housing has a forward transverse horizontal or leading edge 144 disposed at a level just below the level of the axis of the rotor shaft 84. The right-hand end wall 98 of the rotor housing has a bottom edge 146 at the level of the front edge 144. The other end wall 96 has a similarly arranged bottom edge 148 (Fig. 3).

The front or leading edge 144 of the housing 24 is spaced forwardly an appreciable distance from the fore part of the cylinder 90 that is generated during rotation of the rotor 82, thus affording substantial clearance for the radial arms of the rotor as those arms move upwardly, carrying collected crops therewith. The housing 24 has an arcuate top 150 which curves upwardly and rearwardly from the front edge 144 and extends over the rotor and thence over the upper portion of the auger housing 60, the top in the area thereof proximate to the auger housing 60 being spaced above the front edge of the auger housing or trough so as to accomplish the auger inlet opening 80 as previously described. The curvature of the top is such that it gradually approaches a zone 152 of approximate tangency with the upper fore part of the generated cylinder 90 to afford minimum clearance in that zone for the radial arms, the top departing thence gradually upwardly and rearwardly from the zone 152 and joining the conveyor housing or auger trough 60 as described above. As already stated, the close proximity of the top 150 to the cylinder 90 in the zone 152 causes the material to cling to the top and more nearly approach the speed of rotation of the rotor 82 so as to travel rearwardly into the auger trough 60 without material loss back to the ground. Described otherwise, the curvature of the top 150 may be said to be "flattened" in the zone 152.

As best seen in Fig. 5, the length of the rotor 82 exceeds that of the auger trough 60 so that the right-hand end of the rotor, as represented by the right-hand end 102 of the rotor shaft, is transversely beyond or to the right of the terminal end wall 66 of the auger trough 60. As will be noted, the two endmost radial arms 86 on the rotor 82 are thus transversely beyond the right-hand end 64 of the auger housing. This arrangement creates what may be termed a pocket 154 at the right-hand rear corner of the machine, in which pocket the fore part of the right-hand wheel 30 is received. The arrangement is such that the inboard side of the wheel 30, represented by the numeral 156, is proximate to the auger housing end wall 66 and the outboard side of the wheel 30, represented by the numeral 158, is within a fore-and-aft upright plane that includes the right-hand end portion of the rotor 82. Stated otherwise, the wheel 30 will travel a forward path inwardly of a swath next adjacent to the swath being currently operated on by the rotor 82. At the same time, the axis of the wheel can be located forwardly so as to improve the balance of the machine. As shown in Fig. 3, the fore part of the periphery of the wheel is clear of the cylinder 90 generated by rotation of the rotor 82.

The relationship of the wheel 30 to the swath next to that upon which the rotor 82 is operating may best be determined by noting that the right-hand end wall 98 of the rotor housing 24 lies substantially in the fore-and-aft upright plane referred to above. This end wall extends rearwardly, as at 160, and carries therein a bearing 162 for supporting the right-hand end of the axle 22, thus increasing the support of the housing, rotor and auger on the axle. As previously described, the blower housing 26 is supported on the axle via the bracket 56 and, in addition to the support at 160, the combined auger housing and rotor housing structure is carried on the axle by a suitable bracket 164. The left-hand end wall 96 of the rotor housing 24 may be suitably joined to the right-hand wall 40 of the blower housing 26, all of which lends rigidity to the over-all supporting structure and the mounting thereof on the wheels 28 and 30.

As indicated in Fig. 1, the configuration of the top 150 of the housing 24 and the area covered thereby may be such that the wheel-accommodating pocket 154 is enclosed from above. Although the right-hand end extension 70 of the auger shaft 72 bridges the pocket between the terminal end wall 66 of the auger housing 64 and the inner face of the right-hand end wall 98 of the rotor housing 24, it is clear of the periphery of the right-hand wheel 30. Moreover, the rearward extension of the right-hand wall 98 of the rotor housing 24 affords an additional outboard bearing 166 for the extreme right-hand end of the auger shaft extension 70.

Because of the excess in length of the rotor 82 over the auger housing 64, some means must be provided for directing to the auger housing crops collected by the extreme right-hand end of the rotor. For this purpose, the present invention provides a deflector, designated generally by the numeral 168, best shown in Figs. 3 and 5. This deflector has a rear portion 170 joined to the inside surface of the auger housing end wall 66 and an intermediate forwardly and outwardly extending portion 172 of a generally upright nature, having a front terminal portion 174 secured to the inner surface of the rotor housing end wall 98. Thus, as the rotor 82 carries crops upwardly and rearwardly past the upright diameter of the rotor, the crops carried by the right-hand end portion of the rotor are engaged by the deflector 168 and caused to move inwardly and rearwardly to the auger housing 60, thus commingling with other crops picked up by the portion of the rotor 82 that is coextensive in length with the auger housing 60.

As best shown in Fig. 3, the deflector 168 has a bottom arcuate edge 176 that is shaped to clear the cylinder 90 generated during rotation of the rotor 82. The arcuate shape of the upper edge of the deflector, designated generally by the numeral 178, in combination with the arcuate bottom edge 176 causes the deflector to taper forwardly to a point at its front part 174, which point is approximately in the zone 152 previously described.

A still further feature of the invention is the adjustability of the double-wheel or double-sprocket assembly 118 in the drive mechanism at the right-hand or second end of the machine. As best shown in Fig. 7, the bracket 126 that carries the double-sprocket assembly 118 is mounted on the rotor housing end wall 98 by means of a plurality of releasable fastening means, here in the form of bolts 180. The housing end wall 98 is provided with a pair of upwardly and forwardly inclined elongated slots 182 through which the bolts 180 pass. The bracket 126 has a pair of generally fore-and-aft extending elongated slots 184 at each end thereof. The respective bolts pass through these slots as well as through the slots 182. Consequently, when the bolts 180 are loosened, the bracket 126 may be shifted vertically, the bolts 180 moving upwardly or downwardly in the slots 182. The bracket 126 may also be shifted fore and aft, the bolts 180 moving in the fore-and-aft slots 184. Therefore, the tension of either or both of the drive chains 128 and/or 130 may be adjusted. For example, if it is desired to tighten the drive chain 130 without affecting the tension in the chain 128, the bracket 126 will be shifted forwardly to tighten the chain 130 and downwardly to restore in the chain 128 the tension lost by forward movement of the bracket. Any combination of adjustment may be made.

Various features of the invention not specifically enumerated herein will undoubtedly occur to those versed in the art, as will many modifications and alterations in the preferred embodiment of the invention as disclosed, all of which may be achieved without departing from the spirit and scope of the invention.

What is claimed is:

1. A harvester adapted to advance over a field of crops, comprising: supporting structure including first and second ground-engaging wheels spaced apart transversely of the line of advance; crop-receiving means carried by the supporting structure adjacent to the first wheel; an elongated conveyor housing carried by the supporting structure with its length transverse to the line of advance and having a first end adjacent to and communicating with the crop-receiving means and a second end adjacent to but transversely short of the second wheel, said second end being so positioned as to lie at least in part rearwardly of the front peripheral portion of said second wheel; an elongated crop-collecting housing having its length transverse to the line of advance and carried by the supporting structure ahead of and communicating with the conveyor housing, said crop-collecting housing having a top, an open bottom, a first end adjacent to the first end of the conveyor housing and a second end ahead of and projecting transversely beyond at least the inboard side of the second wheel and thus beyond the second end of the conveyor housing; crop-collecting means carried by and within the crop-collecting housing and operative through the open bottom of the crop-collecting housing to collect crops from the field and to move such crops rearwardly into the conveyor housing, said crop-collecting means being substantially coextensive in length with, and having first and second ends respectively adjacent to the first and second ends of, the crop-collecting housing; deflector means in the crop-collecting housing at the second end thereof and directed rearwardly and inwardly to the second end of the conveyor housing to guide into said second end of the conveyor housing crops collected at the second end of the crop-collecting means; and conveyor means in the conveyor housing for moving collected crops transversely to the crop-receiving means.

2. The invention defined in claim 1, in which: the crop-receiving means comprises an upright blower housing containing a blower rotatable on a transverse axis above the wheel axis and having an inlet opening facing toward the second wheel and disposed below said blower axis; the conveyor housing comprises an auger trough transversely alined with said inlet opening; and the conveyor means comprises an auger in the trough and rotatable about an axis intermediate the wheel and blower axes.

3. The invention defined in claim 2, in which: the blower housing carries a rotatable shaft coaxial with and fixed to the blower and projecting transversely adjacent to the first wheel; the auger has coaxial therewith an auger shaft having an end projecting transversely adjacent to the second wheel; the crop-collecting means includes a first and second transverse shaft portions respectively adjacent to and projecting externally of the first and second ends of the crop-collecting housing; first drive means interconnects the blower shaft and the first shaft portion of the crop-collecting means; and second drive means interconnects the second shaft portion of the crop-collecting means and the aforesaid projecting end of the auger shaft.

4. The invention defined in claim 3, in which: the second drive means includes speed-reduction mechanism for operating the auger at a speed lower than that of the crop-collecting means.

5. The invention defined in claim 4, in which: the speed-reduction mechanism comprises a small driving wheel coaxial with and fixed to the second shaft portion of the crop-collecting means; a large driven wheel coaxial with and fixed to the external end of the auger shaft; a double wheel assembly intermediate the aforesaid drive wheels and including a small intermediate wheel and a large intermediate wheel rotatable in unison about a common axis; means mounting the double wheel assembly on the supporting structure at the second end of the crop-collecting housing; a first endless drive element trained about the small driving wheel and about the large intermediate wheel; and a second endless drive element trained about the large driven wheel and about the small intermediate wheel.

6. The invention defined in claim 5, in which: the mounting means for the double wheel assembly comprises a bracket; a shaft on the bracket and carrying the large and small intermediate wheels on their aforesaid common axis; and means for adjusting the position of the bracket on the supporting structure both vertically and fore-and-aft to accommodate changes in tension in both endless drive elements.

7. The invention defined in claim 1, including: a supporting axle portion carrying the second wheel and projecting transversely beyond said second wheel; end wall means at the second end of the crop-collecting housing and extending rearwardly past the second end of the conveyor housing and transversely outwardly of the second wheel; and means connecting the end wall means to the axle portion for said second wheel.

8. The invention defined in claim 7, in which: the conveyor means comprises an auger lengthwise of the conveyor housing and having a central auger shaft including an end portion projecting transversely beyond the second end of said conveyor housing and transversely past the second wheel; and means journaling the auger shaft end portion in the end wall means transversely outwardly of the second wheel.

9. In a harvester having supporting structure adapted to advance over a field of crops; an elongated rotor housing arranged with its length transverse to the line of advance and being of inverted U-shaped section to have an arcuate closed top, an open bottom and opposite end walls, said end walls respectively having bearings coaxial on the principal axis of the housing, and said top having front and rear portions lengthwise of the housing and spaced above the ground; an elongated rotor substantially coextensive in length with the rotor housing and embraced from above by the housing top and projecting through the open bottom of the housing, said rotor having opposite ends respectively closely inwardly of the housing end walls, said rotor having a central shaft journaled in the end wall bearings and a plurality of radial arms connected to the shaft in axially and angularly spaced relation to travel downwardly through the open bottom of the housing, then forwardly to engage and collect fieldborne crops, then upwardly past the front portion of the housing and rearwardy beneath the housing top and rearwardly past the housing rear portion to discharge collected crops rearwardly; an elongated conveyor trough parallel to the rotor housing and having an elongated open portion below and for receiving discharged crops from said housing rear portion, said trough being shorter than the rotor housing and having a terminal end short of the proximate end of the rotor and the proximate end wall of the rotor housing; and a crop deflector within the rotor housing and having a top edge proximate to the housing top, said deflector extending rearwardly and inwardly from said proximate end wall of the housing to the terminal end of the conveyor trough to compensate for the increased length of the housing over the trough, said deflector having a bottom edge shaped to accommodate passage of the proximate rotor arms.

10. In a harvester having supporting structure adapted to advance over a field of crops: an axially elongated crop-collecting rotor having its axis horizontal and transverse to the line of advance and journaled on the supporting structure for rotation about said axis to generate a cylinder while collecting field-borne crops, said rotor having relatively widely axially spaced apart opposite inner and outer ends defining the width of the swath of crops collected by said rotor; an elongated crop conveyor carried by the supporting structure behind the rotor and with its length transverse to the line of advance, said conveyor having lengthwise thereof a crop-inlet portion at a level above the rotor axis and below the top of the aforesaid generated cylinder and behind the rear part of said cylinder to receive collected crops from the rotor, said conveyor having a terminal outer end spaced transversely inwardly of the proximate end of the rotor so that the outer end portion of the rotor extends transversely outwardly beyond said terminal end of the conveyor; housing means enclosing the rotor and the conveyor from above and including front and rear parts respectively over and substantially coextensive in lengths with the rotor and the conveyor; a crop deflector below the housing and above the rotor axis and having a generally upright portion extending forwardly and outwardly from the terminal end of the rotor for deflecting to the conveyor crops collected by said outer end portion of the rotor, said deflector having a bottom part shaped to clear the cylinder generated by the rotor; and a ground-engaging wheel carried by the supporting structure on a transverse horizontal axis, said wheel being located directly behind said outer end portion of the rotor and rearwardly clear of the cylinder generated thereby so as to travel a forward path clear of crops outwardly of the swath being collected by the rotor.

11. A harvester adapted to advance over a field of crops, comprising: supporting structure including first and second sides spaced apart transversely of the line of advance; crop-receiving means carried by the supporting structure adjacent to the first side and including a blower housing, a blower in the housing and a blower shaft supporting the blower and rotatable about a transverse horizontal axis, said shaft having an end portion projecting externally of the blower housing at the first side of the supporting structure; an elongated auger transverse to the line of advance and having its axis parallel to but offset vertically from the blower shaft axis, said auger having a first end feeding into the blower housing and a second end including a shaft portion adjacent to the second side of the supporting structure; a transverse auger trough embracing the auger; a crop-collecting rotor having an axially elongated central shaft positioned ahead of and parallel to the auger and operative to collect field-borne crops and to deliver such crops to the auger for feeding into the blower housing, said rotor shaft having a first end portion at the first side of the supporting structure and ahead of the blower shaft end portion and a second end portion at the second side of the supporting structure and ahead of the aforesaid auger shaft portion; first drive means at the first side of the supporting structure and interconnecting the blower shaft end portion and the first end portion of the rotor shaft; and second drive means at the second side of the supporting structure and interconnecting the second end portion of the rotor shaft and the auger shaft.

12. The invention defined in claim 11, in which: the second drive means includes speed-reduction mechanism for operating the auger at a speed lower than that of the rotor.

13. The invention defined in claim 12, in which: the speed-reduction mechanism comprises a small driving wheel coaxial with and fixed to the second shaft portion of the rotor; a large driven wheel coaxial with and fixed to the auger shaft; a double wheel assembly intermediate the aforesaid drive wheels and including a small intermediate wheel and a large intermediate wheel rotatable in unison about a common transverse axis; means mounting the double wheel assembly on the supporting structure at the second side of the supporting structure; a first endless drive element trained about the small driving wheel and about the large intermediate wheel; and a second endless drive element trained about the large driven wheel and about the small intermediate wheel.

14. The invention defined in claim 13, in which: the mounting means for the double wheel assembly comprises a bracket; a shaft on the bracket and carrying the large and small intermediate wheels on their aforesaid common axis; and means for adjusting the position of the bracket on the supporting structure both vertically and fore-and-aft to accommodate changes in tension in both endless drive elements.

15. In a harvester having supporting structure adapted to advance over a field of crops: an axially elongated crop-collecting rotor having its axis horizontal and transverse to the line of advance and having a central shaft and a plurality of axially and angularly spaced radial arms connected to said shaft; means journaling the shaft on the supporting structure for rotation of the rotor about said axis to generate a cylinder while collecting field-borne crops; an elongated crop conveyor carried by the supporting structure behind the rotor and with its length transverse to the line of advance, said conveyor having lengthwise thereof a crop-inlet portion at a level above the rotor axis and below the top of the aforesaid generated cylinder and behind the rear part of said cylinder and facing generally forwardly to receive collected crops from the rotor; a combined rotor and conveyor housing overlying the rotor and conveyor and extending lengthwise and fore-and-aft thereof, said housing being of inverted U-shaped section and having a horizontal transverse front edge at a level just below the level of the rotor axis and parallel to and spaced forwardly an appreciable distance from the fore part of the aforesaid generated cylinder to afford substantial clearance for the radial arms of the rotor, said housing having an arcuate top curving upwardly and rearwardly from the front edge and over the rotor, the curvature of the top being such that the top gradually approaches a zone of approximate tangency with the upper, fore part of the generated cylinder to afford minimum clearance for the radial arms, said top departing thence gradually upwardly and rearwardly from said zone and joining the conveyor rearwardly of said crop-inlet portion; and means for rotating the rotor in such direction that the radial arms sweep successively downwardly and forwardly through field-borne crops to collect such crops and then upwardly and rearwardly beneath said housing to deliver the collected crops to the conveyor via said crop-inlet portion.

References Cited in the file of this patent

UNITED STATES PATENTS

| | | |
|---|---|---|
| 1,370,919 | Schaefer | Mar. 8, 1921 |
| 2,641,097 | Mast | June 9, 1953 |
| 2,659,188 | Haban | Nov. 17, 1953 |

FOREIGN PATENTS

| | | |
|---|---|---|
| 18,233/24 | Australia | May 19, 1925 |